(12) United States Patent
Arnold et al.

(10) Patent No.: US 7,648,568 B2
(45) Date of Patent: Jan. 19, 2010

(54) HYDROGEN STORAGE TANK SYSTEM BASED ON GAS ADSORPTION ON HIGH-SURFACE MATERIALS COMPRISING AN INTEGRATED HEAT EXCHANGER

(75) Inventors: Gerd Arnold, Nauheim (DE); Ulrich Eberle, Mainz (DE); Dieter Hasenauer, Weinheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 385 days.

(21) Appl. No.: 11/622,211

(22) Filed: Jan. 11, 2007

(65) Prior Publication Data

US 2008/0168776 A1 Jul. 17, 2008

(51) Int. Cl.
*F17C 11/00* (2006.01)
*B01D 53/04* (2006.01)

(52) U.S. Cl. .......................... 96/126; 502/526
(58) Field of Classification Search ................. 502/526; 206/0.7; 423/248, 648.1, 658.2; 420/900; 96/108, 121, 126, 143, 146, 148
See application file for complete search history.

(56) References Cited

U.S. PATENT DOCUMENTS

| | | | | |
|---|---|---|---|---|
| 4,165,569 A | * | 8/1979 | Mackay | 34/416 |
| 4,187,092 A | * | 2/1980 | Woolley | 62/46.2 |
| 4,446,111 A | * | 5/1984 | Halene et al. | 422/200 |
| 4,548,044 A | * | 10/1985 | Sakai et al. | 62/46.2 |
| 4,609,038 A | * | 9/1986 | Ishikawa et al. | 165/104.12 |
| 4,859,427 A | * | 8/1989 | Konishi et al. | 422/159 |
| 4,928,496 A | * | 5/1990 | Wallace et al. | 62/46.2 |
| 4,964,524 A | * | 10/1990 | Halene | 220/586 |
| 6,432,379 B1 | * | 8/2002 | Heung | 423/648.1 |
| 6,991,770 B2 | * | 1/2006 | Suzuki et al. | 422/198 |
| 2001/0039803 A1 | * | 11/2001 | Stetson et al. | 62/46.2 |
| 2002/0000234 A1 | * | 1/2002 | Manker et al. | 128/898 |
| 2002/0020299 A1 | * | 2/2002 | Iwamoto et al. | 96/146 |
| 2003/0209149 A1 | * | 11/2003 | Myasnikov et al. | 96/146 |
| 2004/0093874 A1 | * | 5/2004 | Bradley et al. | 62/46.1 |
| 2005/0188847 A1 | * | 9/2005 | Fujita et al. | 96/126 |

* cited by examiner

*Primary Examiner*—Frank M Lawrence
(74) *Attorney, Agent, or Firm*—John Miller; Miller IP Group, PLC

(57) ABSTRACT

A gas storage system that stores a gas by cryo-adsorption on high surface materials. The gas storage system includes an outer container having insulated walls and a plurality of pressure vessels disposed therein. Each of the pressure vessels includes a high surface material. A manifold assembly distributes the gas under pressure to the pressure vessels where the gas is adsorbed by cryo-adsorption using the high surface materials. A cooling fluid is provided within voids between the pressure vessels to remove heat as the pressure vessels are being filled with the gas.

22 Claims, 4 Drawing Sheets

HYDROGEN STORAGE TANK SYSTEM BASED ON GAS ADSORPTION ON HIGH-SURFACE MATERIALS COMPRISING AN INTEGRATED HEAT EXCHANGER

BACKGROUND OF THE INVENTION

1. Field of the Invention

This invention relates generally to a gas storage system and, more particularly, to a hydrogen gas storage system for storing hydrogen gas by cryo-adsorption on high surface materials.

2. Discussion of the Related Art

A hydrogen vehicle is generally defined as a vehicle that employs hydrogen as its primary source of power for locomotion. A primary benefit of using hydrogen as a power source is that it uses oxygen from the air to produce only water vapor as exhaust. The most efficient use of hydrogen involves the use of fuel cells and electric motors instead of a traditional engine. Hydrogen reacts with oxygen inside the fuel cells, which produces electricity to power the motors.

One primary area of research of hydrogen vehicles involves hydrogen storage to increase the range of hydrogen vehicles while reducing the weight, energy consumption, and complexity of the storage systems. Thus, the efficient storage of hydrogen is a necessary prerequisite for the mass introduction and consumer acceptance of hydrogen-propelled vehicles. Current storage technologies, such as compressed gaseous hydrogen ($CGH_2$) or liquid hydrogen ($LH_2$), pose a limitation on the driving range of such vehicles. Solid-state storage systems, such as classical or complex metal hydrides, for example, $FeTi_2$, $NaAlH_4$ and/or the like, might be a viable alternative, but present heat management challenges for fundamental thermodynamic reasons. In terms of storage capacity, these compounds typically deliver lower system hydrogen capacities than conventional technologies, such as $CGH_2$ and $LH_2$.

Accordingly, there exists a need for a new and improved hydrogen storage system for use with hydrogen-powered vehicles, where the hydrogen storage tank system is operable to efficiently store increased amounts of hydrogen.

SUMMARY OF THE INVENTION

In accordance with the teachings of the present invention, a gas storage system is disclosed that stores a gas by cryo-adsorption on high surface materials. The gas storage system includes an outer container having insulated walls and a plurality of pressure vessels disposed therein. Each of the pressure vessels includes a high surface material. A manifold assembly distributes the gas under pressure to the pressure vessels where the gas is adsorbed by cryo-adsorption using the high surface materials. A cooling fluid is provided within voids between the pressure vessels to remove heat as the pressure vessels are being filled with the gas.

Additional features of the present invention will become apparent from the following description and appended claims taken in conjunction with the accompanying drawings.

DETAILED DESCRIPTION OF THE EMBODIMENTS

The following discussion of the embodiments of the invention directed to a gas storage system is merely exemplary in nature, and is in no way intended to limit the invention or its applications or uses. For example, the gas storage system of the invention has particular application for storing hydrogen for a fuel cell system. However, as will be appreciated by those skilled in the art, the gas storage system of the invention may have application for storing other gases for other systems.

In accordance with one aspect of the present invention, an alternative gas storage mechanism is provided by the so-called physisorption or cryo-adsorption, i.e., physical adsorption of hydrogen molecules on high-surface materials, such as, but not limited to, activated carbons, zeoliths, metal-organic frameworks (MOFs), polymers of intrinsic microporosity (PIMs) and/or the like.

Figure 1:
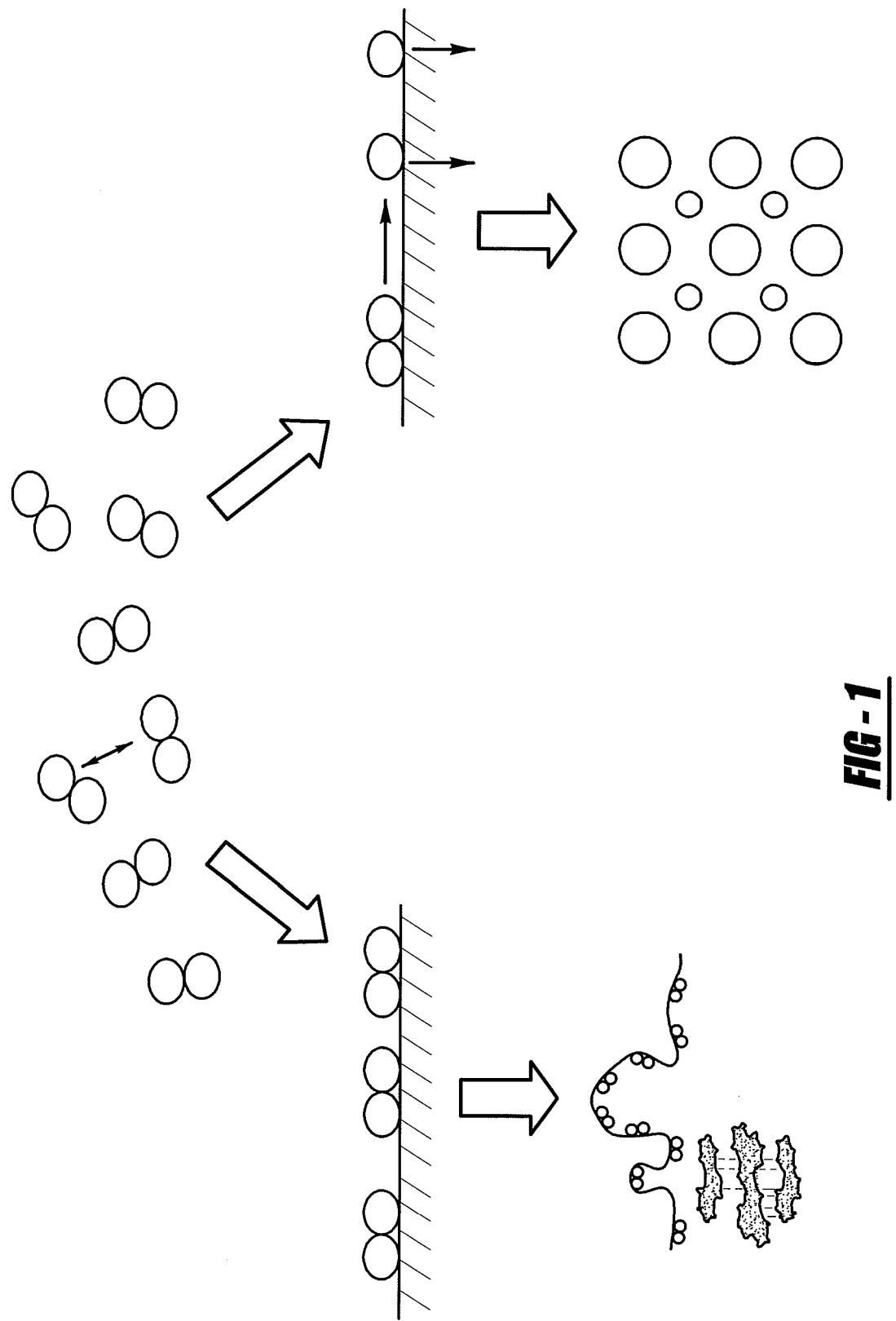
FIG. 1 is a schematic view illustrating hydrogen adsorption on high surface materials compared to hydrogen storage in metal hydrides.

FIG. 1 is an illustration of hydrogen gas molecules being absorbed by a metal hydride surface on the right and by cryo-adsorption on a high-surface material on the left. As is well understood in the art, metal hydride absorption has a high binding energy (typically ranging from 10 to 40 MJ/kg hydrogen) as a result of the hydrogen being strongly bound to the metal hydride in an atomic phase, where the absorption can occur at relatively high temperatures (ranging from ambient temperature to elevated temperatures of 200° C. and higher). As the hydrogen absorbs in the metal hydride, a significant amount of heat is generated by the chemical absorption process, which needs to be removed so that the structural integrity and/or the capacity of the storage system is not affected. Cryo-adsorption adsorbs hydrogen in the molecular phase, where the molecules adhere to the high-surface material by weak bonds, such as Van der Waals forces. Because the surface bonding is weak, it is necessary to reduce the kinetic energy of the hydrogen by reducing its temperature to cryogenic temperatures. As the hydrogen adheres to the high-surface material, heat is generated (order of magnitude of 2.5 MJ/kg), but at a much lower rate than for the metal hydride absorption.

It is necessary to fill a hydrogen tank for a fuel cell vehicle with 5 kilograms of hydrogen in under 5 minutes to meet industry demands. In order to store that amount of hydrogen in that amount of time using a conventional metal hydride storage system, heat has to be removed from the system at a rate of about 25 MJ/kg times 5 kg/300 s, which equals 420 kW for a typical metal hydride. However, in order to maintain the temperature of the hydrogen at cryogenic temperatures for the low binding temperature necessary for cryo-adsorption, the temperature removal rate is about 2.5 MJ/kg of hydrogen times 5 kg/300 s, which equals 42 kW. Therefore, the use of cryo-adsorption to store hydrogen may provide a viable alternative.

The present invention proposes a tank design for storing hydrogen using the afore-mentioned cryo-adsorption mechanism. The cryo-adsorption tank system of the present invention is operated at pressures between 10 and 50 bar and at temperatures from 25K to 200K. Although primary reference will be made to the storage of hydrogen, it should be appreciated that the system of the present invention is capable of storing other gases besides hydrogen.

Figure 2:
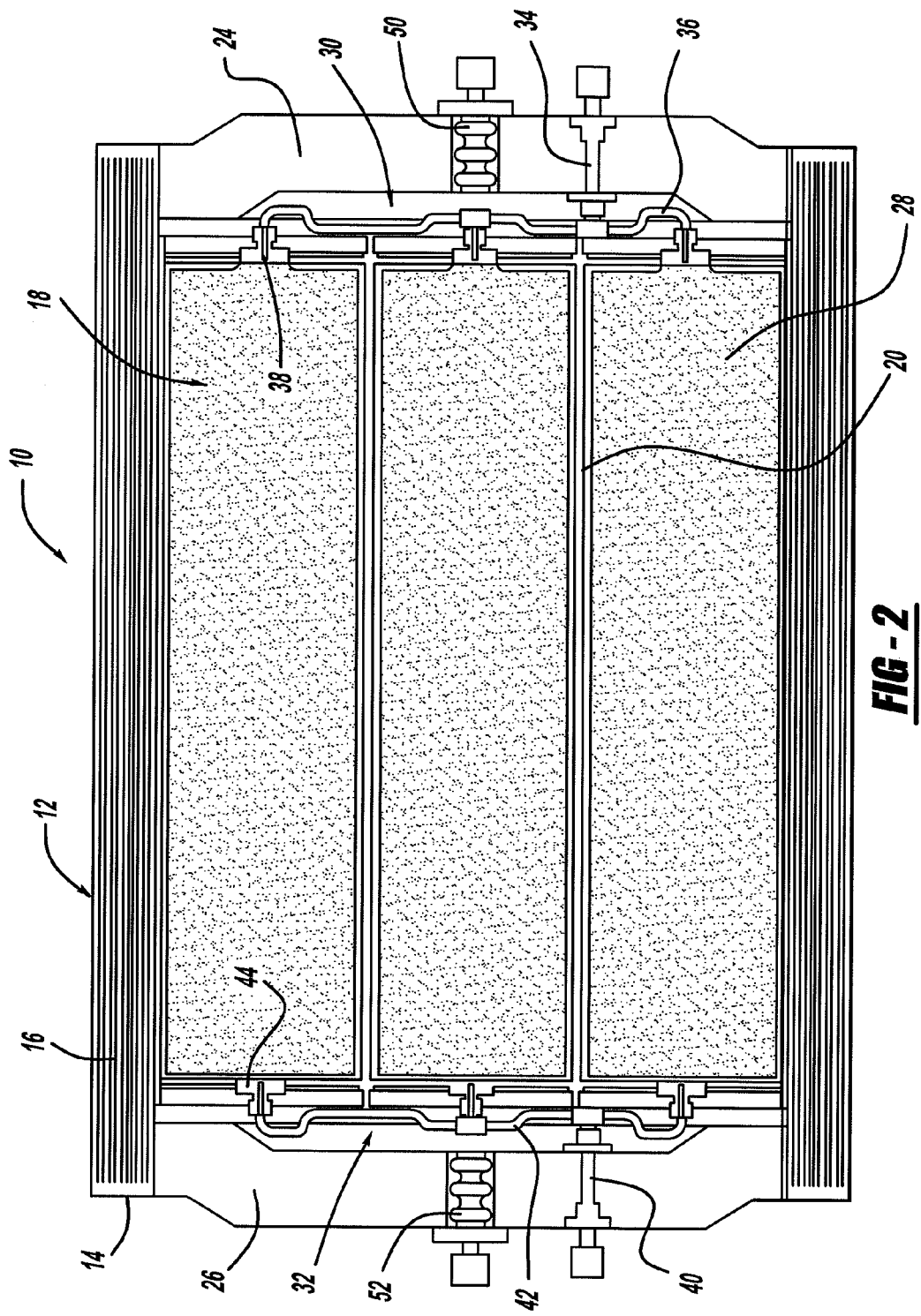
FIG. 2 is a lengthwise cross-sectional view of a gas storage system, according to an embodiment of the present invention.
Figure 3:
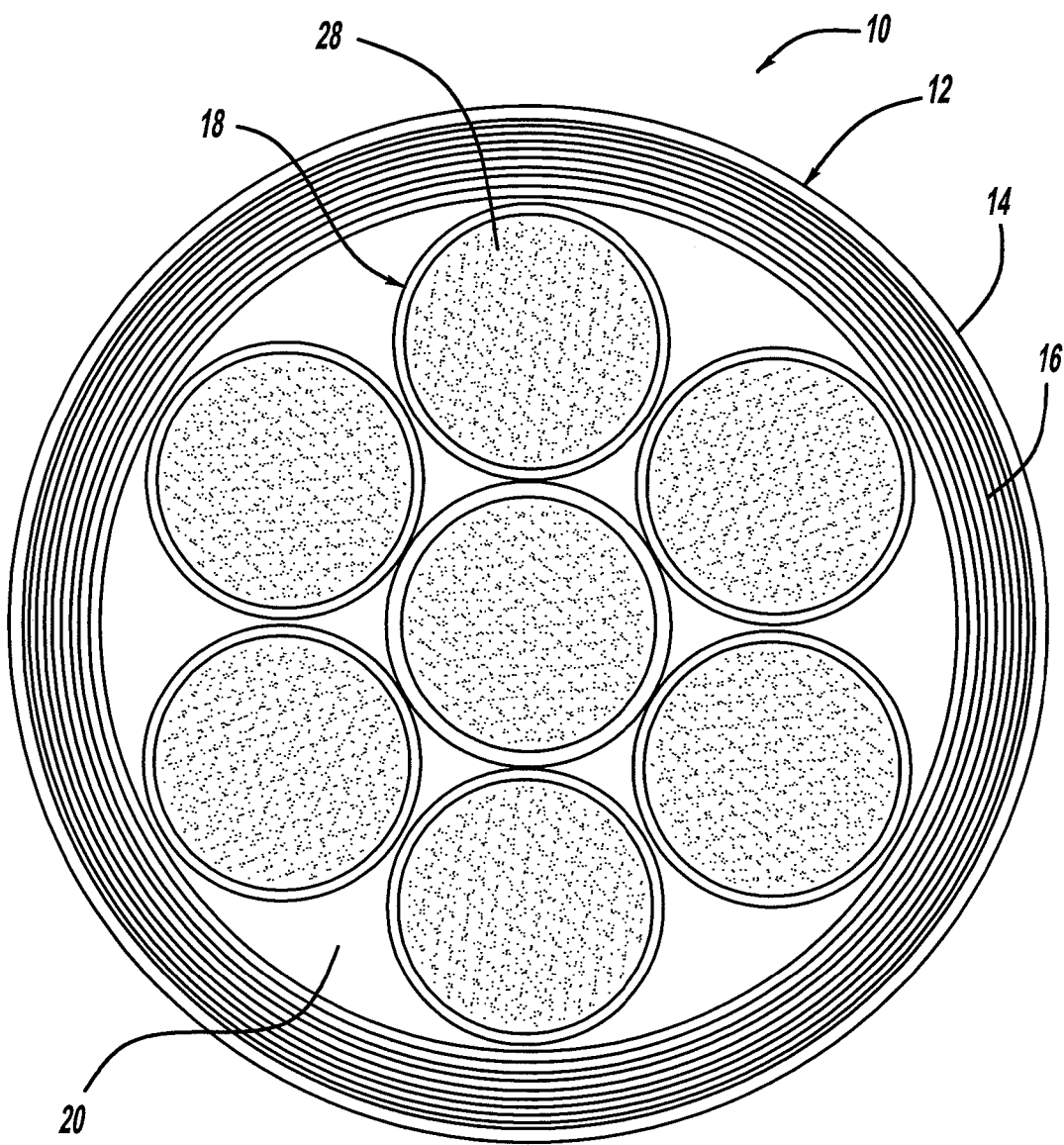
FIG. 3 is another cross-sectional view of the gas storage system shown in FIG. 2.

FIG. 2 is a lengthwise cross-sectional view and FIG. 3 is a cross-sectional view of a gas storage system 10 for storing hydrogen gas, according to an embodiment of the present invention. The storage system 10 includes a cylindrical outer container 12 having a sidewall 14 and end covers 24 and 26. A plurality of pressure vessels 18 are positioned within the outer container 12 in a predetermined configuration, as shown. In this non-limiting embodiment, there are seven pressure vessels 18, where six of the pressure vessels 18 surround a center pressure vessel 18. This configuration of the pressure vessels 18 creates voids 20 between the vessels 18, as shown. The outer container 12 provides thermal insulation for the pressure vessels 18 for reasons that will become apparent from the discussion below. The outer wall 14 and the covers 24 and 26 can include any suitable thermal insulation for the purposes discussed herein, such as a multi-layer vacuum super insulation (MLVSI) 16 or a powder-based vacuum insulation. The outer container 12 also protects the inner components from any potential mechanical damage. The pressure vessels 18 can be made of a suitable high-pressure material, such as stainless steel.

The pressure vessels 18 are filled with a high-surface material 28, such as activated carbons, zeolites, metal-organic frameworks, polymers of intrinsic micro-porosity, etc, suitable for cryo-adsorption. The high-surface material 28 can take on any suitable configuration, such as powders or pellets. It is desirable that the high-surface material 28 includes a high surface area, and that the hydrogen can be adsorbed on the surface area. Therefore, gas distribution lines (not shown) may be required within the pressure vessels 18 to adequately distribute the hydrogen within the vessels 18 depending on the configuration of the high-surface material 28.

Figure 4:
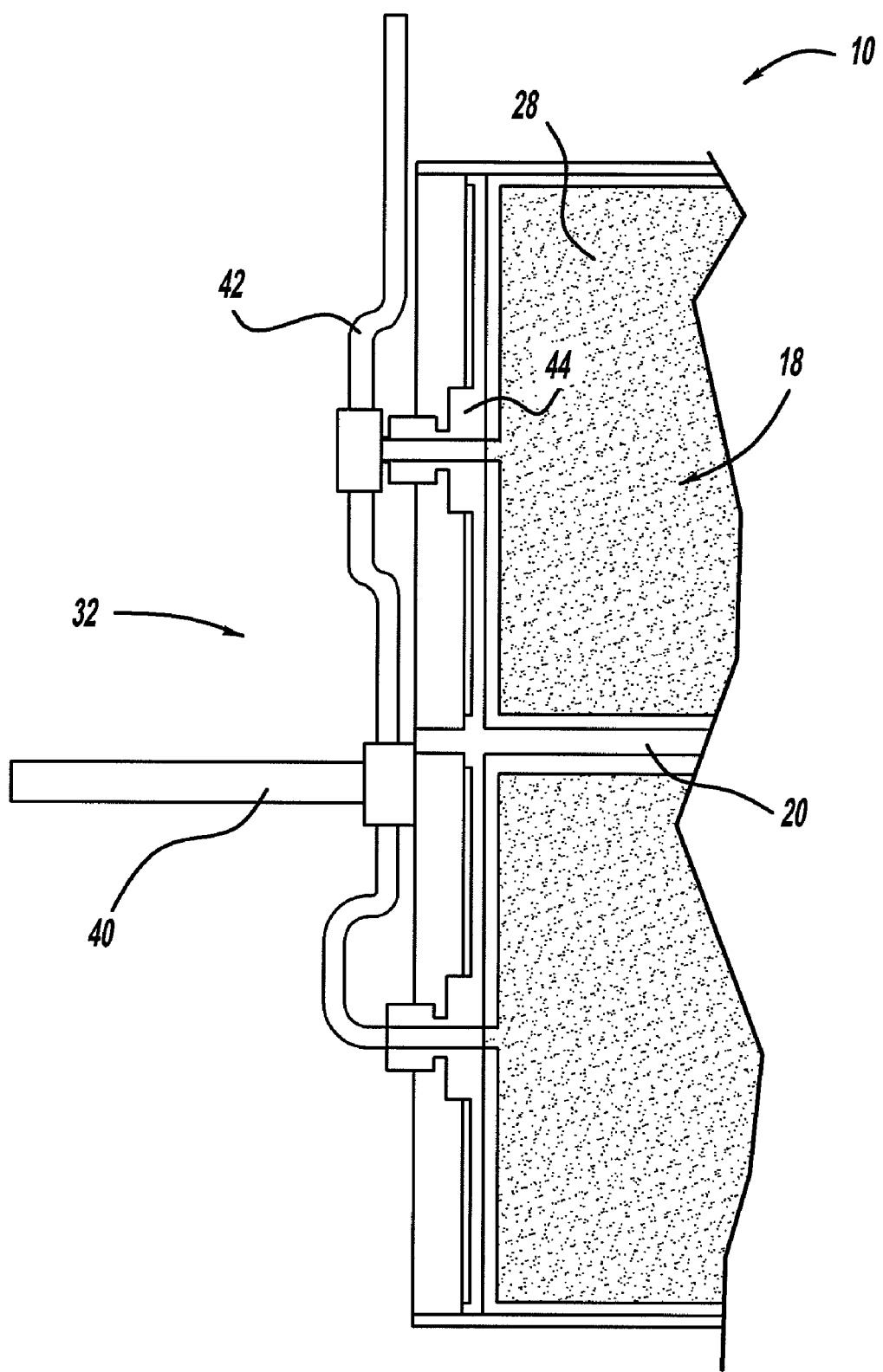
FIG. 4 is a cut-away view showing details of a manifold assembly within the gas storage system of the invention.

The gas storage system 10 also includes a manifold assembly 30 proximate the end cover 24 and a manifold assembly 32 proximate the end cover 26 within the container 12. The manifold assembly 30 includes a hydrogen gas inlet nozzle 34, gas distribution lines 36 and couplers 38. Likewise, the manifold assembly 32 includes a gas outlet nozzle 40, gas distribution lines 42 and couplers 44. Hydrogen gas is introduced into the pressure vessels 18 through the inlet nozzle 34, through the distribution lines 36, through the couplers 38 and into the pressure vessels 18. Hydrogen gas is removed from the pressure vessels 18 through the couplers 44, the gas distribution lines 42 and the outlet nozzle 40. In one embodiment, the hydrogen gas is stored in the pressure vessels 18 at a pressure between 10 and 50 bar. In an alternate embodiment, the manifold 32 can be eliminated, and the manifold assembly 30 can be used to introduce hydrogen into the pressure vessels 18 and remove hydrogen from the pressure vessels 18. FIG. 4 is a close-up, cut-away view of a portion of the manifold assembly 32 and the pressure vessels 18.

If the pressure vessels 18 store hydrogen under pressure, then this pressure can be used to remove the hydrogen from the vessels 18 to operate the fuel cell system. Once the pressure within the vessels 18 is reduced to the pressure of the fuel cell system, any hydrogen remaining within the pressure vessels 18 needs to be removed from the high-surface material 28 by heat, which breaks the weak bonds of the hydrogen molecules to the high surface material 28.

The gas storage system 10 also includes a coolant inlet nozzle 50 and a coolant outlet nozzle 52 in fluid communication with the voids 20. When the pressure vessels 18 are being filled with hydrogen, the voids 20 are typically filled with a cryogenic coolant through the nozzle 50 to cool the pressure tanks 18 and remove the heat generated by the cryo-adsorption process. Suitable coolants include, but are not limited to, liquid nitrogen, liquid argon, hydrogen, etc. As the coolant is warmed by the adsorption reaction, it evaporates, and reduces its ability to remove heat (contingently to limit the pressure, some coolant has to be vented). The container 12 maintains the coolant in the cryogenic state for as long as possible. Once the pressure vessels 18 are filled, then it may be necessary to remove the coolant through the outlet nozzle 52, and replace it with a warm fluid, such as gaseous nitrogen, to facilitate the desorption of hydrogen from the pressure vessels 18 during system operation. In an alternate embodiment, the coolant outlet nozzle 52 can be removed, and the coolant can be introduced and removed from the voids 20 through the nozzle 50.

It should be appreciated that other auxiliary components can be included in the gas storage system 10, including but not limited to, conduits, gauges, valves, electrical heaters to facilitate desorption and/or the like, as are known in the art, but have not be shown here for purposes of clarity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gas storage system for storing a gas, said system comprising:
    an outer container including insulated walls;
    a plurality of pressure vessels positioned within the outer container in a configuration that provides voids between the plurality of vessels;
    a high surface gas adsorber media disposed within each of the vessels, said adsorber media being effective to adsorb the gas by cryo-adsorption; and
    at least one coolant nozzle coupled to the outer container, said coolant nozzle being selectively opened and closed so as to allow a suitable heat exchange fluid to be held in the container by filling the voids between the plurality of pressure vessels.

2. The system according to claim 1 wherein the plurality of pressure vessels is seven pressure vessels configured as six of the pressure vessels surrounding a seventh pressure vessel.

3. The system according to claim 2 wherein the outer container is cylindrical.

4. The system according to claim 1 further comprising a manifold assembly that allows the plurality of pressure vessels to be in fluid communication with each other.

5. The system according to claim 1 wherein the gas is hydrogen.

6. The system according to claim 1 wherein the adsorber media is selected from the group consisting of activated carbons, zeoliths, metal-organic frameworks, polymers of intrinsic microporosity, and combinations thereof.

7. The system according to claim 1 wherein the storage system is operated at a temperature in the range of about 25K to 200K during the cryo-adsorption process.

8. The system according to claim 1 wherein the plurality of pressure vessels store the gas at a pressure in the range of 10 bar to 50 bar.

9. The system according to claim 1 further comprising a coolant provided within the outer container so as to cool the adsorber media to a cryo-temperature.

10. The system according to claim 9 wherein the coolant is selected from the group consisting of hydrogen, nitrogen, argon, and combinations thereof.

11. The system according to claim 1 wherein the insulation is selected from the group consisting of multi layer vacuum super insulation, powder-based vacuum insulation, and combinations thereof.

12. A gas storage system for storing a gas, said system comprising:
- an outer container including insulated walls;
- a plurality of pressure vessels positioned within the outer container so as to provide voids between the plurality of vessels;
- a high surface gas adsorber material disposed within each of the pressure vessels;
- a manifold assembly including a gas inlet nozzle for distributing the gas to the plurality of pressure vessels, said adsorber material adsorbing the gas in a molecular phase so as to store the gas; and
- at least one coolant nozzle extending through a wall of the container and being in fluid communication with the voids, said coolant nozzle accepting a suitable heat exchange fluid for filling the voids so as to remove heat during the as adsorbing process.

13. The system according to claim 12 wherein the outer container is a cylindrical container, and wherein the plurality of pressure vessels are seven pressure vessels configured within the outer container where six of the pressure vessels are disposed around a seventh pressure vessel.

14. A gas storage system for storing hydrogen gas, said system comprising:
- a cylindrical outer container including insulated walls;
- a plurality of pressure vessels contained within the outer vessel member and providing voids therebetween;
- a gas adsorber media disposed within each pressure vessel;
- a manifold assembly that allows the plurality of pressure vessels to be in fluid communication with each other; and
- a coolant inlet nozzle and a coolant outlet nozzle coupled to the outer container, said coolant inlet nozzle being selectively opened and closed so as to allow a suitable heat exchange fluid to be directed into the container by filling the voids between the plurality of pressure vessels, and said coolant outlet nozzle being selectively opened and closed so as to allow the heat exchange fluid to be removed from the container.

15. The system according to claim 14 wherein the plurality of pressure vessels is seven pressure vessels configured as six of the pressure vessels surrounding a seventh pressure vessel.

16. The system according to claim 14 wherein the adsorber media is selected from the group consisting of activated carbons, zeoliths, metal-organic frameworks, polymers of intrinsic microporosity, and combinations thereof.

17. The system according to claim 14 wherein the storage system is operated at a temperature in the range of about 25K to 200K.

18. The system according to claim 14 wherein the plurality of pressure vessels store the gas at a pressure in the range of 10 bar to 50 bar.

19. The system according to claim 14 further comprising a suitable heat exchange fluid provided within the voids so as to cool the adsorber media to a cryo-temperature.

20. The system according to claim 19 wherein the coolant is selected from the group consisting of hydrogen, nitrogen, argon, and combinations thereof.

21. The system according to claim 14 wherein the insulation is selected from the group consisting of multi layer vacuum super insulation, powder-based vacuum insulation, and combinations thereof.

22. The system according to claim 1 further comprising gas distribution lines within the high surface gas adsorber media disposed within the plurality of pressure vessels so as to facilitate distribution of the gas within the high surface gas adsorber media.

* * * * *